US012168519B2

(12) United States Patent
Baig et al.

(10) Patent No.: US 12,168,519 B2
(45) Date of Patent: Dec. 17, 2024

(54) HYBRID-ELECTRIC SINGLE ENGINE DESCENT FAILURE MANAGEMENT

(71) Applicant: RTX CORPORATION, Farmington, CT (US)

(72) Inventors: Zubair Ahmed Baig, South Windsor, CT (US); Matt Dushek, West Hartford, CT (US); Martin Richard Amari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 127 days.

(21) Appl. No.: 17/976,333

(22) Filed: Oct. 28, 2022

(65) Prior Publication Data

US 2023/0139529 A1 May 4, 2023

Related U.S. Application Data

(60) Provisional application No. 63/273,452, filed on Oct. 29, 2021.

(51) Int. Cl.
*B64D 27/24* (2024.01)
*B64D 27/14* (2006.01)
*B64D 31/00* (2006.01)
*F02C 6/00* (2006.01)
*H02K 7/18* (2006.01)
*B64D 27/02* (2006.01)

(52) U.S. Cl.
CPC ............. *B64D 27/24* (2013.01); *B64D 27/14* (2013.01); *B64D 31/00* (2013.01); *F02C 6/00* (2013.01); *H02K 7/1823* (2013.01); *B64D 27/026* (2024.01)

(58) Field of Classification Search
CPC ........ B64D 27/24; B64D 27/14; B64D 31/00; B64D 27/026; B64D 2221/00; F02C 6/00; H02K 7/1823; Y02T 50/60; B60L 50/16; B60L 50/61; B60L 2200/10; B60L 2220/42
See application file for complete search history.

(56) References Cited

U.S. PATENT DOCUMENTS 9,873,518 B2 * 1/2018 Sautreuil ................ B64D 27/10
10,081,350 B2 * 9/2018 Zhou ....................... B60L 58/12
(Continued)

FOREIGN PATENT DOCUMENTS

EP 3772148 A1 2/2021

OTHER PUBLICATIONS

Search Report issued in European Patent Application No. 22204532.0; Application Filing Date Oct. 28, 2022; Date of Mailing Mar. 14, 2023 (10 pages).

*Primary Examiner* — Medhat Badawi
(74) *Attorney, Agent, or Firm* — CANTOR COLBURN LLP

(57) ABSTRACT

A hybrid-electric aircraft system is provided and includes first and second hybrid-electric engines, each of which includes an electric motor to drive operations thereof, and a supplemental power unit (SPU). The SPU is configured as a thermal engine paired with a generator and is configured to generate electrical power. The first and second hybrid-electric engines are operable normally and off, respectively, with electrical power generated by the SPU being diverted to the electric motor of the second hybrid-electric engine.

17 Claims, 6 Drawing Sheets

(56) References Cited

U.S. PATENT DOCUMENTS

| | | | | |
|---|---|---|---|---|
| 10,094,235 B2* | 10/2018 | Burns | | F02C 7/32 |
| 11,401,041 B2* | 8/2022 | Baig | | B64D 27/026 |
| 11,536,153 B2* | 12/2022 | Morgan | | F01D 15/12 |
| 11,542,874 B2* | 1/2023 | Tamada | | F02C 9/42 |
| 11,565,821 B2* | 1/2023 | Baig | | B64D 27/02 |
| 11,781,477 B2* | 10/2023 | Muldoon | | F02C 6/08 |
| | | | | 60/785 |
| 11,867,069 B2* | 1/2024 | Farris | | F02C 9/22 |
| 2007/0267540 A1* | 11/2007 | Atkey | | B64D 41/00 |
| | | | | 244/58 |
| 2014/0013751 A1* | 1/2014 | Roggemans | | B64D 27/24 |
| | | | | 60/705 |
| 2016/0061053 A1* | 3/2016 | Thomassin | | F02C 7/32 |
| | | | | 415/69 |
| 2016/0070266 A1* | 3/2016 | DiVito | | B60L 58/13 |
| | | | | 307/9.1 |
| 2016/0204615 A1* | 7/2016 | Radun | | B64D 41/00 |
| | | | | 307/9.1 |
| 2018/0041028 A1* | 2/2018 | Wilhide | | H02M 3/04 |
| 2018/0300191 A1* | 10/2018 | Bengea | | G06F 11/0703 |
| 2019/0005826 A1* | 1/2019 | Lax | | G08G 5/0091 |
| 2019/0006867 A1* | 1/2019 | Heglund | | H02J 7/0068 |
| 2019/0063333 A1* | 2/2019 | Bengea | | F23N 1/002 |
| 2020/0031480 A1* | 1/2020 | Baig | | B60L 50/61 |
| 2020/0056497 A1* | 2/2020 | Terwilliger | | F02C 6/02 |
| 2020/0079518 A1* | 3/2020 | Latulipe | | B64D 35/08 |
| 2020/0123926 A1* | 4/2020 | Amari | | F01D 17/24 |
| 2020/0248622 A1* | 8/2020 | Crowley | | F02C 7/057 |
| 2020/0307813 A1* | 10/2020 | Pekovic | | B64D 27/026 |
| 2020/0347787 A1* | 11/2020 | Crowley | | F02C 9/00 |
| 2021/0054782 A1* | 2/2021 | Kupratis | | F02C 6/14 |
| 2021/0115857 A1* | 4/2021 | Collopy | | F02C 7/262 |
| 2021/0222629 A1* | 7/2021 | Terwilliger | | B64D 27/24 |
| 2021/0394916 A1* | 12/2021 | Baig | | B64D 31/00 |
| 2023/0139529 A1* | 5/2023 | Baig | | B64D 27/14 |
| | | | | 244/55 |
| 2023/0417178 A1* | 12/2023 | Muldoon | | F02C 9/18 |

* cited by examiner

HYBRID-ELECTRIC SINGLE ENGINE DESCENT FAILURE MANAGEMENT

CROSS-REFERENCE TO RELATED APPLICATIONS

This application claims priority to U.S. Provisional Application No. 63/273,452 filed Oct. 29, 2021, the contents of which are hereby incorporated by reference in its entirety.

BACKGROUND

Exemplary embodiments pertain to the art of gas turbine engines, and in particular to aircraft hybrid-electric engines.

An aircraft can selectively power a hybrid-electric engine by providing electric power from various sources. During descent with one engine turned off with thrust provided by electric power and the other engine operating with fuel burn, various aspects must be considered such that the engine system operates efficiently, and such that the engine operating on electric power can rapidly resume a fuel-burn mode of operation if and when that is needed.

For example, during single engine descent, thrust matching is performed. For example, 1000 pounds of thrust per engine would be achieved by driving one engine fan electrically to provide 1000 pounds of thrust and by driving the other engine in a fuel-burning mode can generate power for the electrically-operated engine and produce 1000 pounds of thrust.

BRIEF DESCRIPTION

According to an aspect of the disclosure, a hybrid-electric aircraft system is provided and includes first and second hybrid-electric engines, each of which includes an electric motor to drive operations thereof, and a supplemental power unit (SPU). The SPU is configured as a thermal engine paired with a generator and is configured to generate electrical power. The first and second hybrid-electric engines are operable normally and off, respectively, with electrical power generated by the SPU being diverted to the electric motor of the second hybrid-electric engine.

In accordance with additional or alternative embodiments, the second hybrid-electric engine is off during descent.

In accordance with additional or alternative embodiments, normal operation of the first hybrid-electric engine includes the first hybrid-electric engine operating at a minimum descent idle level.

In accordance with additional or alternative embodiments, the second hybrid-electric engine being off is simultaneous with diversion of the electrical power generated by the SPU to the electric motor of the second hybrid-electric engine.

In accordance with additional or alternative embodiments, the SPU includes a turbine operably disposed within an aircraft fuselage.

In accordance with additional or alternative embodiments, the SPU includes an SPU controller configured to independently operate the SPU.

In accordance with additional or alternative embodiments, each of the first and second hybrid-electric engines includes a full authority digital engine control (FADEC) and the SPU includes an SPU controller which is configured to independently operate the SPU and which is directly communicative with the FADEC of each of the first and second hybrid-electric engines.

In accordance with additional or alternative embodiments, the electrical power generated by the SPU is blended with electrical power from one or more other sources for diversion to the electric motor of the second hybrid-electric engine.

According to an aspect of the disclosure, a hybrid-electric aircraft system is provided and includes first and second hybrid-electric engines, each of which includes an electric motor to drive operations thereof, a supplemental power unit (SPU) configured as a thermal engine paired with a generator and to generate electrical power and a control system. The control system is operably coupled to each of the first and second hybrid-electric engines and to the SPU. The control system is configured to run the first hybrid-electric engine normally with the second hybrid-electric engine off and to divert electrical power generated by the SPU to the electric motor of the second hybrid-electric engine.

In accordance with additional or alternative embodiments, the control system diverts electrical power generated by the SPU to the electric motor of the second hybrid-electric engine during descent.

In accordance with additional or alternative embodiments, normal running of the first hybrid-electric engine includes running the first hybrid-electric engine at a minimum descent idle level.

In accordance with additional or alternative embodiments, the second hybrid-electric engine being off is simultaneous with electrical power generated by the SPU being diverted to the electric motor of the second hybrid-electric engine.

In accordance with additional or alternative embodiments, the SPU includes a turbine operably disposed within an aircraft fuselage.

In accordance with additional or alternative embodiments, the SPU includes an SPU controller configured to operate the SPU independently from the control system.

In accordance with additional or alternative embodiments, each of the first and second hybrid-electric engines includes a full authority digital engine control (FADEC) and the SPU includes an SPU controller which is configured to operate the SPU independently from the control system and which is directly communicative with the FADEC of each of the first and second hybrid-electric engines.

In accordance with additional or alternative embodiments, each of the first and second hybrid-electric engines includes a full authority digital engine control (FADEC), the SPU includes an SPU controller and the control system is communicative with the FADEC of each of the first and second hybrid-electric engines and the SPU controller.

In accordance with additional or alternative embodiments, the control system is further configured to blend electrical power generated by the SPU with electrical power from one or more other sources for diversion to the electric motor of the second hybrid-electric engine.

According to as aspect of the disclosure, a method of operating a hybrid-electric aircraft system including first and second hybrid-electric engines, each of which includes an electric motor, and a supplemental power unit (SPU) configured to generate electrical power is provided. The method includes initiating a fuel conservation mode, running the first hybrid-electric engine normally with the second hybrid-electric engine being off and diverting electrical power generated by the SPU to the electric motor of the second hybrid-electric engine.

In accordance with additional or alternative embodiments, the second hybrid-electric engine being off is simultaneous with the diverting of the electrical power generated by the SPU to the electric motor of the second hybrid-electric engine.

In accordance with additional or alternative embodiments, the second hybrid-electric engine being off and the diverting of the electrical power generated by the SPU to the electric motor of the second hybrid-electric engine are executed during descent.

In accordance with additional or alternative embodiments, the running of the first and second hybrid-electric engines normally and in the low power mode, respectively, and the directing of bleed air from the first hybrid-electric engine to the second hybrid-electric engine are simultaneous.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Electric generators and motors have been incorporated into aircraft engines to provide a hybrid-electric engine that produces electric energy for various engine and aircraft support systems. However, primary power production and operation relies on conversion of the high-energy exhaust gas flow into mechanical power. Aircraft control systems for hybrid-electric engines systems have been developed, which allow for selectively powering the hybrid-electric engine by providing electric power from various sources to reduce fuel consumption and improve overall engine efficiencies. During descent with one engine operating on electric power and the other engine operating with fuel burn, various aspects must be considered such that the engine system operates efficiently, and the engine operating on electric power can rapidly resume a fuel-burn mode of operation.

Figure 1:
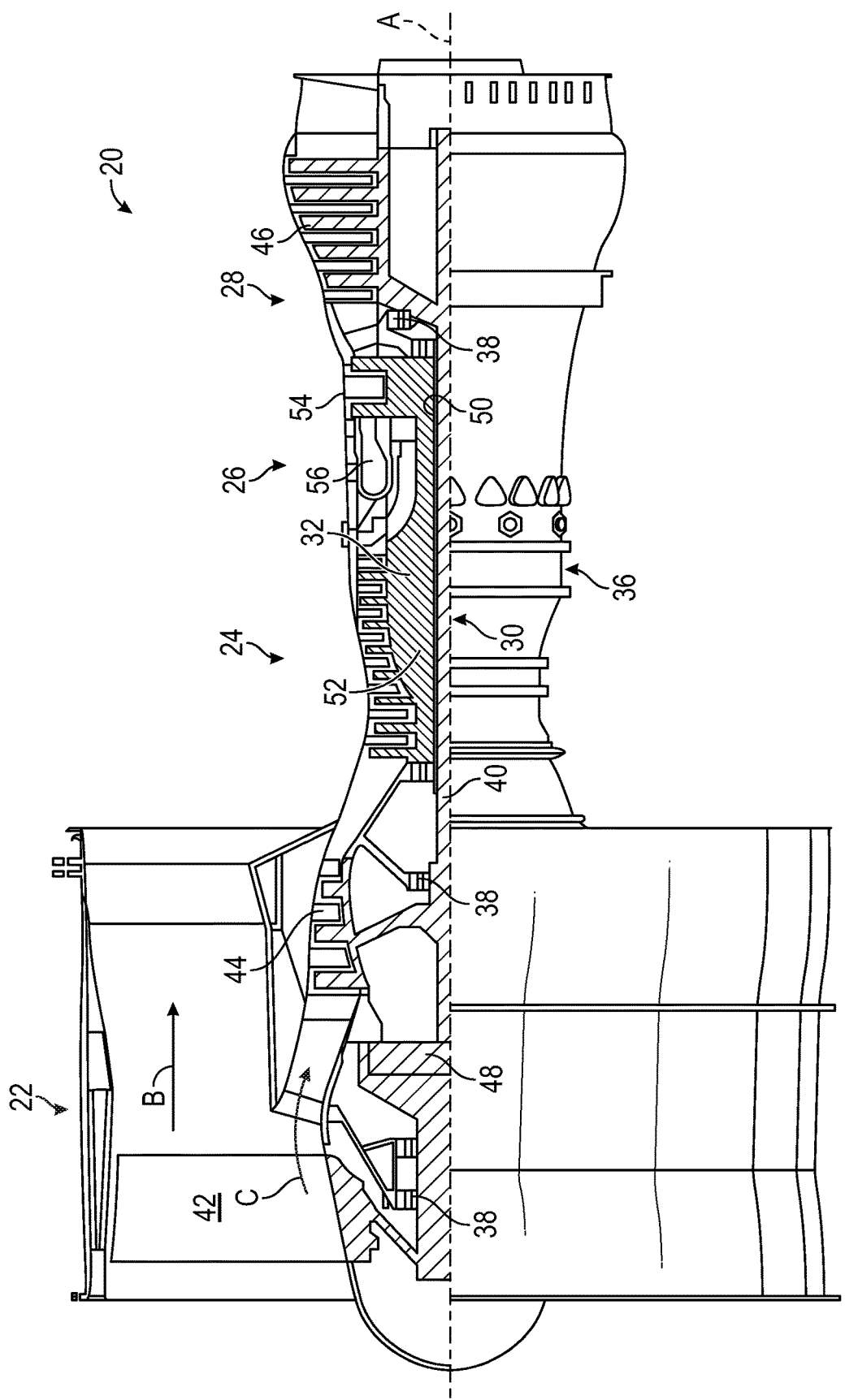
FIG. 1 a partial cross-sectional illustration of a gas turbine engine according to a non-limiting embodiment.

With reference now to FIG. 1, a gas turbine engine 20 is illustrated according to a non-limiting embodiment. The gas turbine engine 20 is disclosed herein as a multi-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with multi-spool turbofans as the teachings may be applied to other types of turbine engines including, for example, three-spool architectures.

The exemplary engine 20 generally includes one or more low-spool generator machines 30, referred to herein as a "low-spool" 30 and a high-spool generator machine 32, referred to herein as a "high-spool 32" mounted for rotation about an engine central longitudinal axis (A) relative to an engine static structure 36 via several bearing systems 38. It should be understood that various bearing systems 38 at various locations may alternatively or additionally be provided, and the location of bearing systems 38 may be varied as appropriate to the application.

The low-spool 30 generally includes an inner shaft 40 that interconnects a fan 42, a low-pressure compressor 44 and a low-pressure turbine 46. The inner shaft 40 is connected to the fan 42 through a speed change mechanism, which in exemplary gas turbine engine 20 is illustrated as a geared architecture 48 to drive the fan 42 at a lower speed than the low-spool 30. The high-spool 32 includes an outer shaft 50 that interconnects a high-pressure compressor 52 and high-pressure turbine 54. A combustor 56 is arranged in exemplary gas turbine 20 between the high-pressure compressor 52 and the high-pressure turbine 54. An engine static structure 36 is arranged generally between the high-pressure turbine 54 and the low-pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The turbines 46, 54 rotationally drive a respective low-spool 30 and high-spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption, also known as "bucket cruise. Thrust Specific Fuel Consumption (TSFC') is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction. In one or more non-limiting embodiments, the temperature correction can be determined according to the relationship of [(Tram ° R)/(518.7° R)]0.5, where Tram is a ram air temperature. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
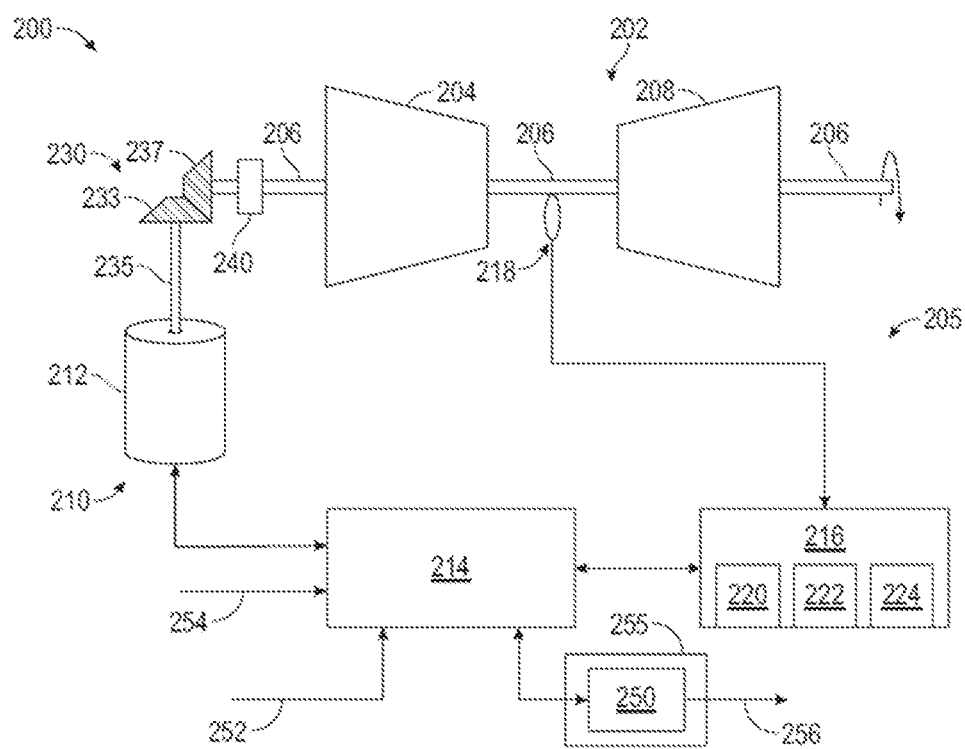
FIG. 2 is a schematic diagram of a hybrid-electric gas turbine engine system including a power management system in accordance with a non-limiting embodiment of the disclosure.

FIG. 2 illustrates portions of a hybrid-electric gas turbine engine system 200 according to a non-limiting embodiment. The hybrid-electric gas turbine engine system 200 includes a rotor system 202 and a power management system 205. The rotor system 202 includes at least one compressor section 204 and at least one turbine section 208 operably coupled to a shaft 206. The rotor system 202 can include one or more spools of the gas turbine engine 20 of FIG. 1, such as one or more low-spools 30 and/or one or more high-spools 32. For example, employing one or more low-spools 30, one or more compressor sections 204 can be equivalent to the low-pressure compressor 44, the shaft 206 can be equivalent to the inner shaft 40, and the at least one turbine section 208 can be equivalent to the low-pressure turbine 46 of FIG. 1. When embodied as the high-spool 32, one or more compressor sections 204 can be equivalent to the high-pressure compressor 52, the shaft 206 can be equivalent to the outer shaft 50, and the at least one turbine section 208 can be equivalent to the high-pressure turbine 54 of FIG. 1.

In the example of FIG. 2, a battery charging system 210 is operably coupled to the rotor system 202. The battery charging system 210 includes a generator 212 operably coupled to the shaft 206. In the example of FIG. 2, a geared interface 230 operably couples the generator 212 to the shaft 206. The geared interface 230 can include, for instance, an auxiliary gear 233 coupled to an auxiliary shaft 235 driven by the generator 212. The geared interface 230 can also include a rotor gear 237 coupled to the shaft 206. The auxiliary gear 233 and the rotor gear 237 can each be beveled gears. The auxiliary shaft 235 can be a tower shaft that enables the generator 212 to be separated at a greater distance from the rotor system 202 than direct coupling to the shaft 206 would provide. Further separation of the generator 212 from the rotor system 202 can improve accessibility to the generator 212 for servicing and may reduce heating effects of the rotor system 202 on the generator 212 (e.g., due to fuel combustion). A disconnect 240, such as a clutch, can be positioned between the generator 212 and a portion of the shaft 206 such that the generator 212 can be selectively engaged and disengaged to rotate with rotation of the shaft 206. In alternate embodiments, the generator 212 is operably coupled to the shaft 206 absent the geared interface 230 (e.g., direct coupling).

The battery charging system 210 also includes a power converter system 214 in signal communication with the generator 212 and a battery system 255. In some embodiments, the generator 212 is a motor-generator configurable in a generator mode to charge a rechargeable battery included in the battery system, and in a motor mode to provide supplemental rotation force to the rotor system 202 of gas turbine engine 20 of FIG. 1. The power converter system 214 includes converter electronics configured to condition current from the generator 212 such that the battery included in the battery system 255 can be repeatedly recharged. The converter electronics include, but are not limited to, analog current (AC) distribution circuitry, bi-directional power electronic circuitry, direct current (DC) power distribution electronics, AC-to-DC converter electronics, DC-to-DC converter electronics, rectifier circuits, a battery system, and an auxiliary power unit (APU)/supplemental power unit (SPU).

The generator 212 can include conventional generator/motor components, such as a rotor and stator, including a plurality of windings and/or permanent magnets. The converter electronics 214 can also include conventional current control electronics, such as filters, switching components, rectifiers, inverters, voltage converters, and the like. The generator 212 can perform as a variable frequency generator in a generator mode due to speed fluctuations of rotation of the shaft 206, which may be primarily driven by the at least one turbine section 208. Alternatively, a frequency normalizing component can interface with the generator 212 to produce a constant frequency output (e.g., through the converter electronics 214 or as a mechanical interface between the generator 212 and the shaft 206). In some embodiments, the generator 212 may be operable as a starter motor to partially or completely power rotation of the shaft 206 in a starting mode of operation (e.g., to start the gas turbine engine 20 of FIG. 1) and/or can provide supplemental power to the shaft 206 during various flight phases of the hybrid-electric aircraft 200. Other uses and functions for the generator 212 are contemplated.

The converter electronics 214 can control charging of the battery system 255 responsive to a controller 216. The controller 216 can enable a flow of a charging current from the generator 212 or a power input 252 to charge the battery included in the battery system 255 as regulated and conditioned through the converter electronics 214. The power input 252 can be an external input, such as power received through a plug interface while the hybrid-electric aircraft 200 is on the ground at a ground-based power source, e.g., at a gate or service location. In some embodiments, the converter electronics 214 may receive electric current from an auxiliary power input 254 to provide a supplemental or alternative power source for charging the battery included in the battery system 255. For instance, the auxiliary power input 254 may receive electric current from an auxiliary power unit (not depicted) or another instance of the gas turbine engine 20 on the hybrid-electric aircraft 200. The charge stored in the battery system 255 can provide an electric current for a propulsion system use 256, which may include powering one or more electric motors of the hybrid-electric aircraft 200 during various operational states and/or providing power to the generator 212 when operating in a motor mode, for instance, to assist in driving rotation of shaft 206. The propulsion system uses 256 can be part of the gas turbine engine 20 that includes the rotor system 202 or another aircraft system, such as another instance of the gas turbine engine 20 on the hybrid-electric aircraft 200.

In embodiments, the controller 216 of the battery charging system 210 can monitor one or more rotor system sensors 218 while the rotor system 202 is rotating. The rotor system sensors 218 can be any type or combination of sensors operable to measure aspects of the motion of the rotor system 202. For example, the rotor system sensors 218 can include one or more accelerometers, speed sensors, torque sensors, and the like. The rotor system sensors 218 can include existing sensors used for controlling the gas turbine engine 20. The controller 216 can control a charging of the battery system 255, for instance, by selecting the source of electric current received through the converter electronics 214. Data collected from the rotor system sensors 218 can be used to determine an operational status of a gas turbine engine 20 of FIG. 2. Alternatively, the operational status of a gas turbine engine 20 can be received as a signal or message from an alternate source, such as an engine system or aircraft communication bus. The controller 216 may also control other system aspects, such as controlling operation of the gas turbine engine 20 of FIG. 1. For example, the controller 216 can be integrally formed or otherwise in communication with a full authority digital engine control (FADEC) of the gas turbine engine 20. The rotor system sensors 218 need not be directly coupled to the controller 216, as sensor data or sensor-derived data can be observed or determined by another control (e.g., a FADEC) and provided to the controller 216.

In embodiments, the controller 216 can include a processing system 220, a memory system 222, and an input/output interface 224. The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more rotor system sensors 218 and interface with the power converter system 214 and/or other systems (not depicted).

Figure 3:
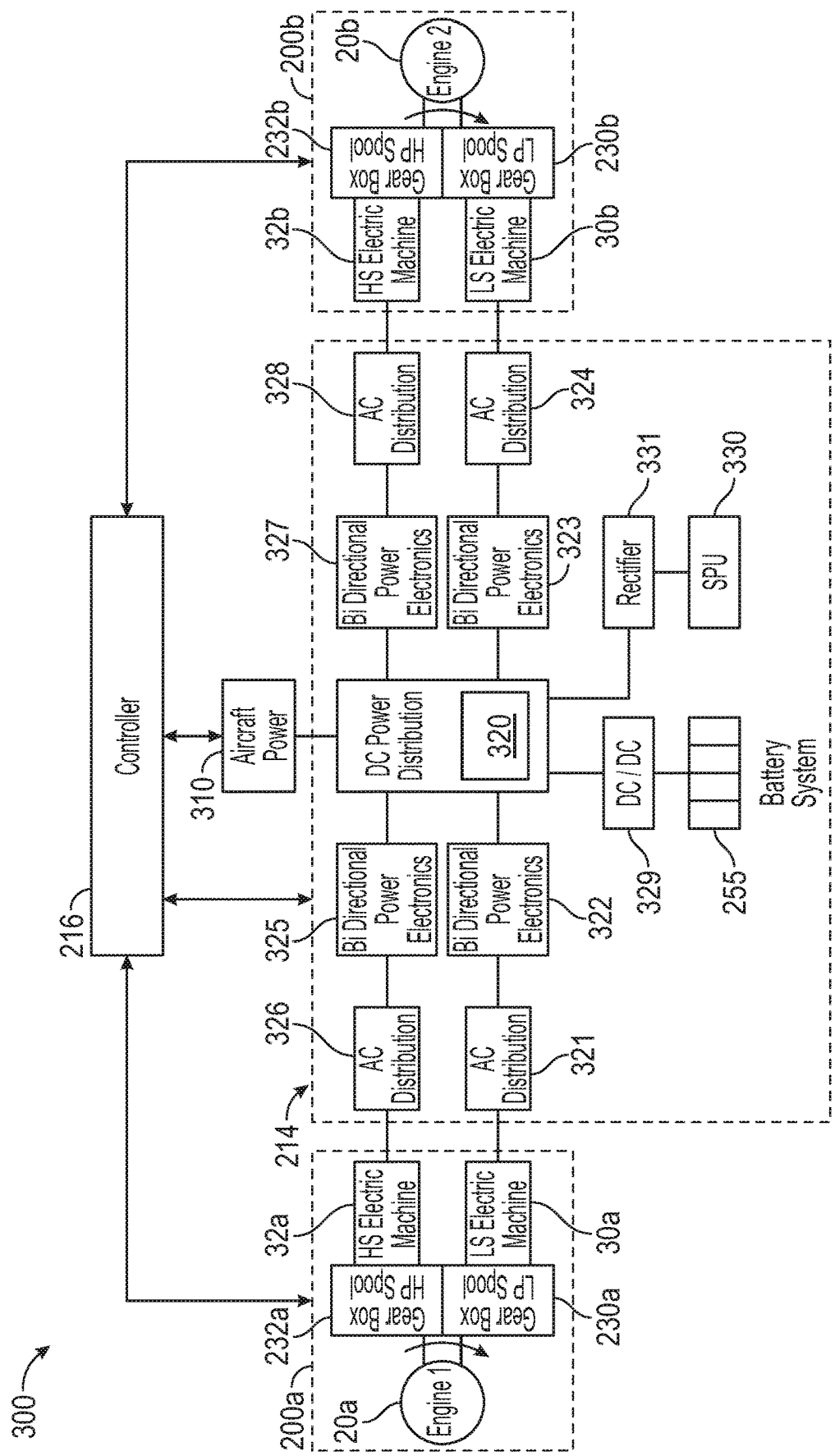
FIG. 3 is a block diagram of a hybrid-electric engine management system according to a non-limiting embodiment.

Turning now to FIG. 3, a hybrid-electric engine management system 300 is illustrated. The hybrid-electric engine management system 300 includes a first hybrid-electric engine system 200a, a second hybrid-electric engine syst 200b, a power converter system 214, an aircraft power system 310, and an aircraft controller 216.

The first hybrid-electric engine system 200a includes a first gas turbine engine 20a, a low-spool electric machine 30a, an optional second low-spool electric machine (not shown), and a high-spool electric machine 32a. The high-spool electric machine 32a can be coupled to the first hybrid-electric engine system 20a via a geared interface 232a. Similarly, the electric machine 30a is coupled to the first gas turbine engine 20a via a geared interface 230a.

The second hybrid-electric engine system 200b includes a second gas turbine engine 20b, a low-spool electric machine 30b, an optional second low-spool electric machine (not shown), and a high-spool electric machine 32b. The high-spool electric machine 32b is coupled to the second hybrid-electric engine system 20b via a geared interface 232b. Similarly, the low-spool electric machine 30b can be coupled to the second gas turbine engine 20b via a geared interface 230b.

The power converter system 214 includes a direct current (DC) power distribution bus 320. The DC power distribution bus 320 includes multiple contactors and switches by which the DC power distribution bus 320 can connect to the low-spool electric machine 30a via bi-directional power electronics 321 and an alternating current (AC) distribution bus 322, to the low-spool electric machine 30b via bi-directional power electronics 323 and an AC distribution bus 324, to the high-spool electric machine 32a via bi-directional power electronics 325 and an alternating current (AC) bus 326 and to the high-spool electric machine 32b via bi-directional power electronics 327 and an AC distribution bus 328. In addition, the DC power distribution bus 320 also includes multiple contactors and switches by which the DC power distribution bus 320 can connect to the battery system 255 via a DC/DC converter 329 and to supplemental power unit (SPU) 330 via rectifier 331.

The SPU 330 can be configured as a turbine engine that is normally disposed in an aft section of a tail of an aircraft and will be described in further detail below.

Thus, the power converter system 214 includes converter electronics configured to provide power to the aircraft power system 310 and/or the battery system 255. For example, the power converter system 214 can deliver power to the aircraft power system 310, which can be utilized to power the aircraft galley, cabin lighting system, cabin HVAC systems, etc. The power converter system 214 can also deliver power to the battery system 255 to charge one or more rechargeable batteries. The power converter system 214 can also deliver power from the battery system 255 to the aircraft power system 310 and/or to the first and or second hybrid engine system 200a and 200b.

The controller 216 is in signal communication with the first hybrid-electric engine system 200a, the second hybrid-electric engine system 200b, the power converter system 214 and the aircraft power system 310. In one or more non-limiting embodiments, the controller 216 can selectively control various operations of the first and second hybrid-electric engine systems 200a and 200b such as, for example, selectively activating and deactivating the first and/or second engines 20a and 20b. The controller 216 can also selectively activate and deactivate the low-spool electric machine 30a and the high-spool electric machine 32a included in the first hybrid-electric engine system 200a and/or the low-spool electric machine 30b and the high-spool electric machine 32b included in the second hybrid-electric engine systems 200b. In one or more non-limiting embodiments, the controller can selectively activate the low-spool electric machines and the high-spool electric machine independently from one another. In one or more non-limiting embodiments, the controller 216 can selectively activate or deactivate one of the low-spool electric machines (e.g., low-spool electric machine 31a) included in a given hybrid-electric engine systems with respect to other low-spool electric machines (e.g., low-spool electric machine 30*a*) included in a given hybrid-electric engine system (e.g., hybrid-electric engine system 200*a*).

With continued reference to FIG. 3, to reduce fuel consumption and improve overall operating efficiency during descent of the aircraft, the aircraft controller 216 can deactivate the second gas turbine engine 20*b* while maintaining activation of the first gas turbine engine 20*a*. Accordingly, power generated by the low-spool electric machine 30*a* included in the first hybrid-electric engine system 200*a* is conditioned by the power converter system 214, and delivered to the low-spool electric machine 30*b* included in the second hybrid-electric engine system 200*b*. Alternatively, to reduce fuel consumption and improve overall operating efficiency during descent of the aircraft but without deactivating the second gas turbine engine 20*b*, the aircraft controller 216 can control an operation of the second gas turbine engine 20*b* to operate at low power levels and with minimal fuel burn while maintaining activation of the first gas turbine engine 20*a*. Maintaining the second gas turbine engine 20*b* in a lit condition will increase reliability, for instance, if there is an electrical fault or if descent is aborted.

Figure 4:
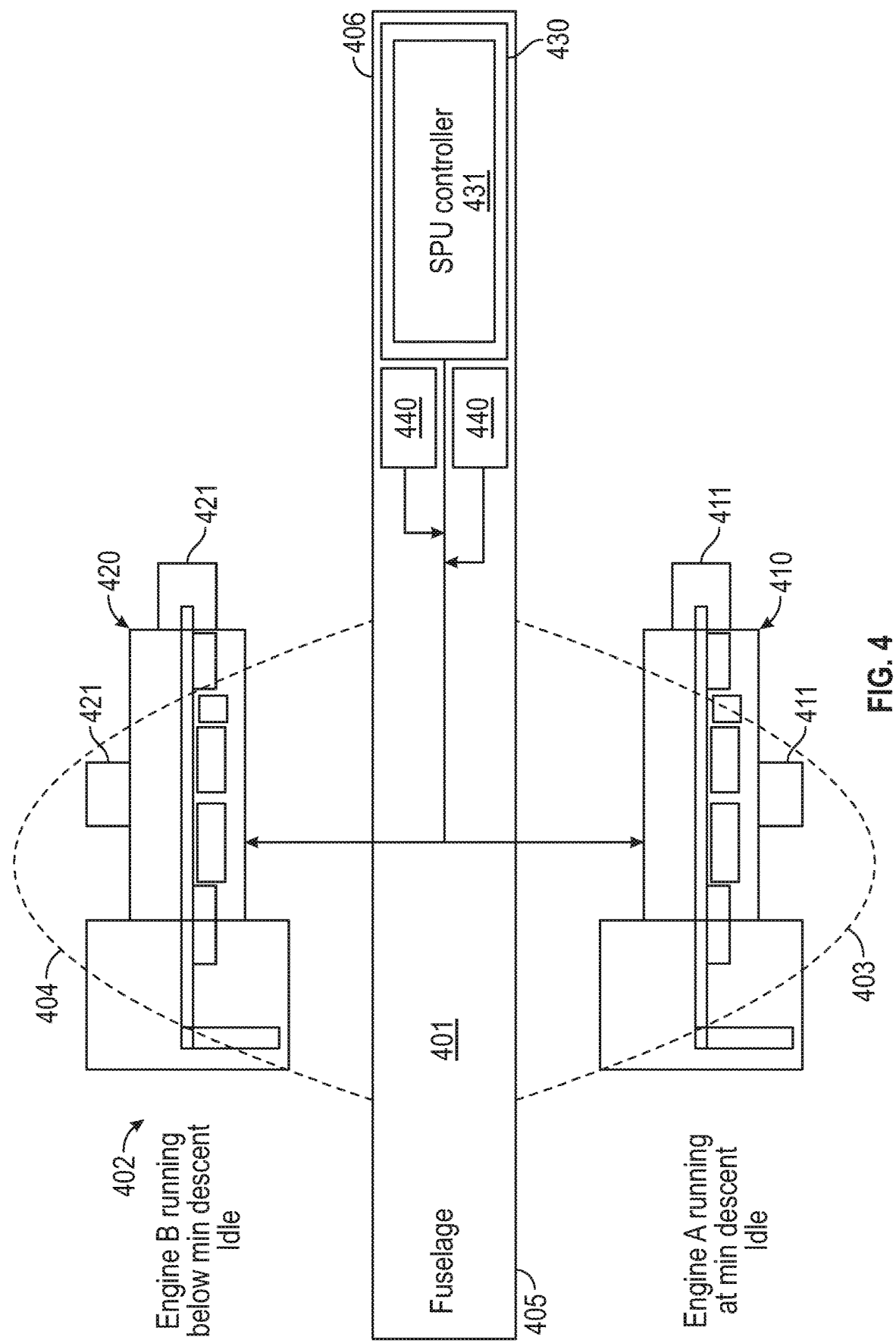
FIG. 4 is a block diagram illustrating a hybrid-electric aircraft system in accordance with embodiments.

Thus, with continued reference to FIG. 3 and with additional reference to FIG. 4, a hybrid-electric aircraft system 401 is provided to allow the low second gas turbine engine 20*b* (see FIG. 3) to be operated at the low power levels and with minimal fuel burn or turned off within no fuel burn during certain flight envelopes such as, but not limited to, descent for example. The hybrid-electric aircraft system 401 can be deployed in an aircraft 402 with first and second wings 403 and 404 that extend outwardly from fuselage 405 having a tail section 406. The hybrid-electric aircraft system 401 includes a first hybrid-electric engine 410 arranged on the first wing 403, a second hybrid-electric engine 420 arranged on the second wing 404, an SPU 430 and a control system (i.e., the controller 216 of FIG. 3). The hybrid-electric aircraft system 401 can further include additional or alternative power sources 440 (e.g., the battery system 255 of FIG. 3 or an auxiliary power unit or APU).

The first hybrid-electric engine 410 includes a first electric motor 411 that is configured to drive certain operations of the first hybrid-electric engine 410 and the second hybrid-electric engine 420 includes a second electric motor 421 that is configured to drive certain operations of the second hybrid-electric engine 420 (see the description of the first and second hybrid-electric engine systems 200*a* and 200*b* provided above with reference to FIG. 3). The SPU 430 can include or be provided as a turbine that is operably disposed within the fuselage 405 or, in some cases, the tail section 406 of the fuselage 405. The SPU 430 is configured as a thermal engine paired with a generator and to generate electrical power that can be distributed to various systems on the aircraft 402 including, but not limited to, either the first electric motor 411 or the second electric motor 421.

In accordance with embodiments, in order to conserve fuel for example during descent, the first hybrid-electric engine 410 can run normally or at a minimum descent idle level, the second hybrid-electric engine 420 can run in a low-power mode or below the minimum descent idle level or be turned off and the electrical power generated by the SPU 430 can be diverted to the second electric motor 421 of the second hybrid-electric engine 420 to power the second electric motor 421 to continue to drive certain non-thermal, rotational operations of the second hybrid-electric engine 420. In these or other cases, the electrical power generated by the SPU 430 can be blended with electrical power drawn from the additional or alternative power sources 440. The running of the first hybrid-electric engine 410 normally or at the minimum descent idle level, the running of the second hybrid-electric engine 420 in the low-power mode or below the minimum descent idle level or the second hybrid-electric engine 420 being turned off can be executed simultaneously with the diversion of the electrical power generated by the SPU 430 to the second electric motor 421.

In accordance with further embodiments, in order to conserve fuel for example during descent, the control system or the controller 216 of FIG. 3 can be operably coupled to each of the first and second hybrid-electric engines 410 and 420 and to the SPU 430. In this condition, the control system can be configured to run or operate the first hybrid-electric engine 410 normally or at the minimum descent idle level, to run or operate the second hybrid-electric engine 420 in the low-power mode or below the minimum descent idle level or to turn the second hybrid-electric engine 42 off and to divert the electrical power generated by the SPU 430 to the second electric motor 421 of the second hybrid-electric engine 420 to power the second electric motor 421 to continue to drive certain non-thermal, rotational operations of the second hybrid-electric engine 420. In these or other cases, the control system can blend the electrical power generated by the SPU 430 with the electrical power drawn from the additional or alternative power sources 440. The running of the first hybrid-electric engine 410 normally or at the minimum descent idle level and the running of the second hybrid-electric engine 42 in the low-power mode or below the minimum descent idle level or the turning of the second hybrid-electric engine 42 off can be executed by the control system simultaneously with the diversion of the electrical power generated by the SPU 430 to the second electric motor 421.

Figure 5:
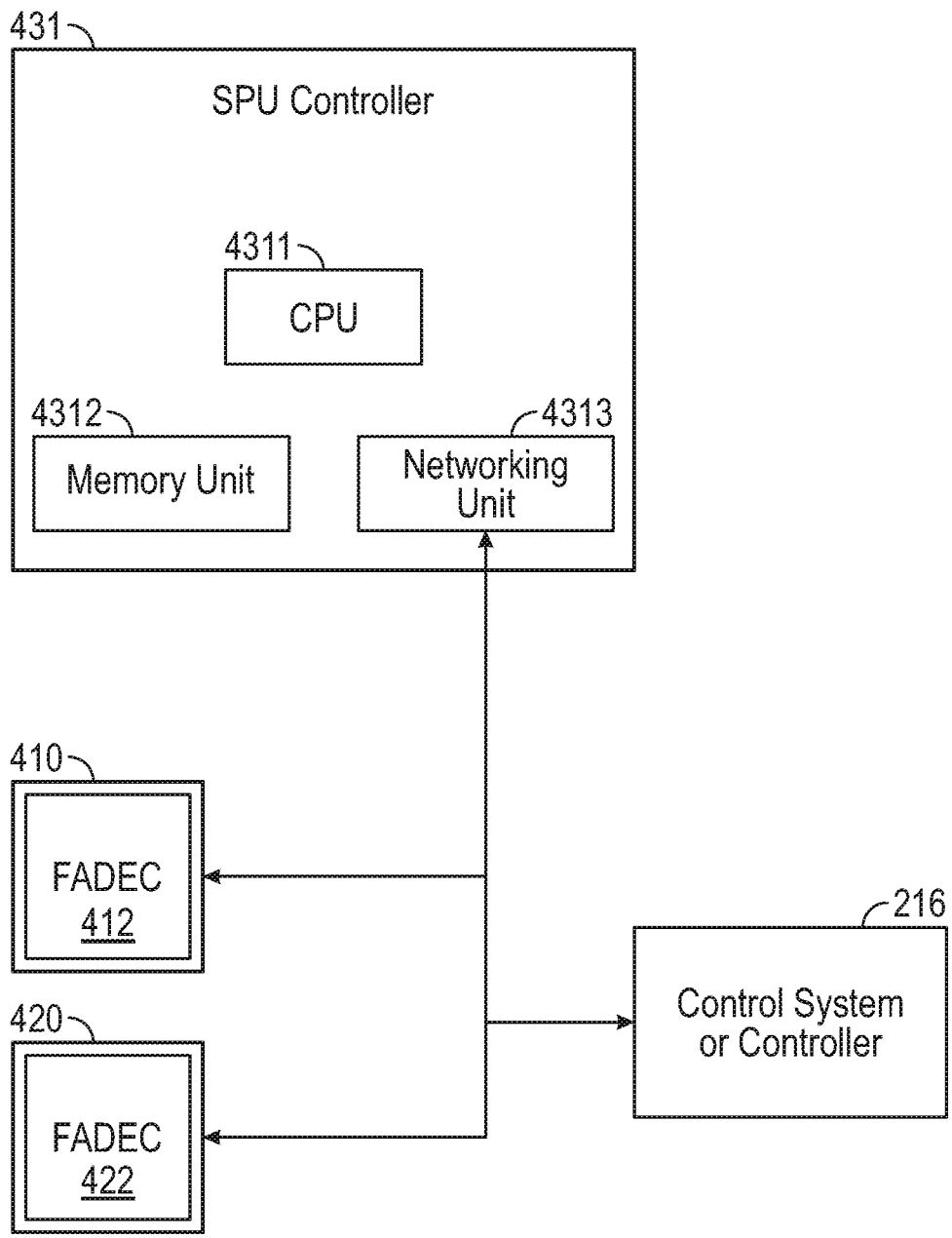
FIG. 5 is a schematic diagram illustrating communicative components of the hybrid-electric aircraft system of FIG. 4 in accordance wither embodiments.

With reference to FIG. 5, the SPU 430 can include an SPU controller 431 that is configured to operate the SPU 430 independently from the control system or the controller 216 of FIG. 3. That is, the SPU controller 431 can cause the SPU 430 to spool up automatically or based on the SPU controller 431 determining that the SPU 430 should be operational. In accordance with additional or alternative embodiments, each of the first and second hybrid-electric engines 410 and 420 can include a full authority digital engine control (FADEC) 412 and 422 and, in these or other cases, the SPU controller 431 can be directly communicative with the FADEC 412 and the FADEC 422. By way of such communications, the SPU controller 431 can independently determine an operational condition of either or both of the first and second hybrid-electric engines 410 and 420 and thus cause the SPU 430 to spool up accordingly. In addition, the SPU controller 431 can be configured to determine whether communications with either of the FADECs 412 and 422 is inactive or otherwise indicative of a fault and thus cause the SPU 430 to spool up accordingly. In accordance with still further additional or alternative embodiments, the FADECs 412 and 422 and the SPU controller 431 can each be communicative with the control system or the controller 216 of FIG. 3. In these or other cases, the SPU controller 431 can control operations of the SPU 430 in accordance with commands provided by the control system or the controller 216 of FIG. 3.

As shown in FIG. 5, the SPU controller 431 can include or be provided with a central processing unit (CPU) 4311, a memory unit 4312 and a networking unit 4313 by which the CPU 4311 is communicative with the FADECs 412 and 422 and with the control system or the controller 216 of FIG. 3. The memory unit 4312 has executable instructions stored thereon which are readable and executable by the CPU 4311 to cause the CPU 4311 to execute the methods and operations described herein. The controller 216 of FIG. 3 can be configured similarly.

With the configurations described above, during descent of the aircraft 402 and an initialization of a fuel conservation mode, the control system or the controller 216 of FIG. 3 (or the SPU controller 431 or any other control element) can execute the operation of the first hybrid-electric engine 410 in the normal or minimum descent idle level and the operation of the second hybrid-electric engine 420 in the low-power or below minimum descent idle level or the turning of the second hybrid-electric engine 420 off as well as the simultaneous diversion of the electrical power from at least the SPU 430 (and optionally electrical power from the additional or alternative power sources 440) to the second electric motor 421 of the second hybrid-electric engine 420 to power the second electric motor 421 to continue to drive certain non-thermal, rotational operations of the second hybrid-electric engine 420. This can be done by at least closing electrical contacts that are electrically interposed between the SPU 430 and the second electric motor 421. In this way, as shown in FIG. 3, the electrical power generated by the SPU 430 can be drawn from the SPU 430 and directed through the rectifier 331, through the DC power distribution bus 430, through the bi-directional power electronics 323 and 327 and through the AC distribution busses 324 and 328 to either or both of the low-spool or high-spool electric machines 30b or 32b. This diverted electrical power can thus be used to power either or both of the low-spool or high-spool electric machines 30b or 32b which can then continue to drive operations of the second gas turbine engine 20b.

Figure 6:
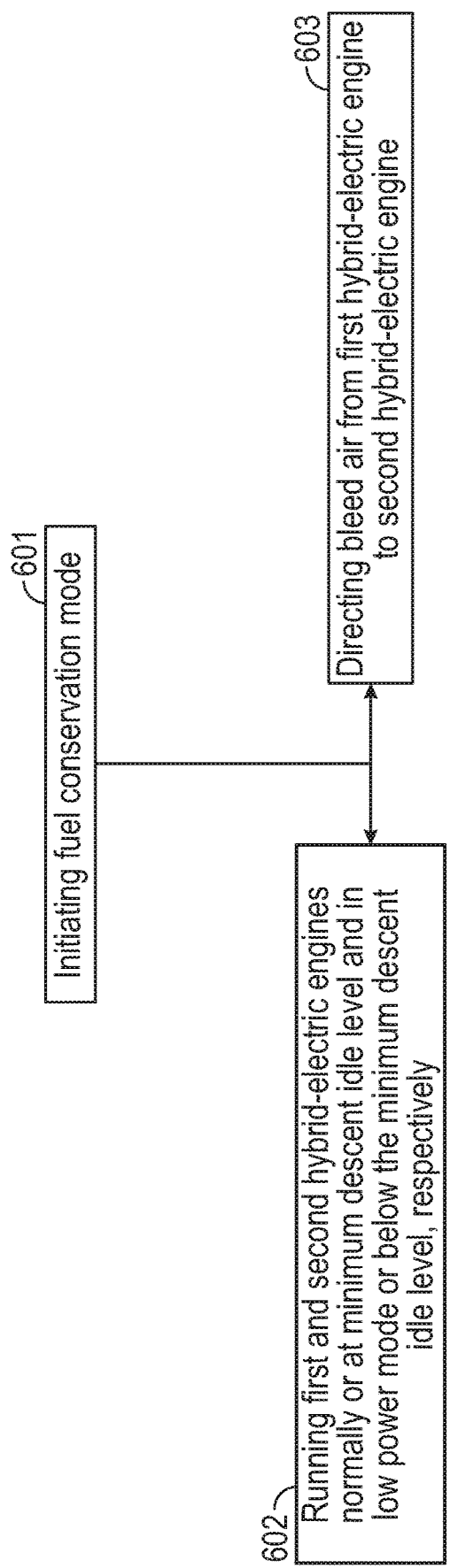
FIG. 6 is a flow diagram illustrating a method of operating a hybrid-electric aircraft system in accordance with embodiments.

With reference to FIG. 6, a method of operating a hybrid-electric aircraft system as described above and that includes first and second hybrid-electric engines, each of which comprises an electric motor, and a supplemental power unit (SPU) configured to generate electrical power is provided. As shown in FIG. 6, the method includes initiating a fuel conservation mode (601), running the first hybrid-electric engine normally with the second hybrid-electric engine being turned off (602) and diverting electrical power generated by the SPU to the electric motor of the second hybrid-electric engine (603). The running of the first hybrid-electric engine normally or at the minimum descent idle level with the second hybrid-electric engine being turned off of operation 602 can be executed simultaneously with the diverting of the electrical power generated by the SPU to the electric motor of the second hybrid-electric engine during descent of operation 603.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid-electric aircraft system, comprising:
   first and second hybrid-electric engines, each of which comprises a gas turbine engine and an electric motor to drive operations of the first and second hybrid-electric engines;
   a supplemental power unit (SPU) configured as a thermal engine paired with a generator and to generate electrical power; and
   a control system,
   wherein the first hybrid-electric engine is operable under control of the control system and the second hybrid-electric engine is operable with the gas turbine engine of the second hybrid-electric engine shut off under control of the control system with electrical power generated by the SPU diverted to the electric motor of the second hybrid-electric engine, and
   wherein each of the first and second hybrid-electric engines comprises a full authority digital engine control (FADEC) and the SPU comprises an SPU controller which is configured to independently operate the SPU independently from the control system and which is directly communicative with the FADEC of each of the first and second hybrid-electric engines.

2. The hybrid-electric aircraft system according to claim 1, wherein the first hybrid-electric engine is operable and the second hybrid-electric engine is operable with the gas turbine engine of the second hybrid-electric engine shut off during descent.

3. The hybrid-electric aircraft system according to claim 1, wherein operation of the first hybrid-electric engine comprises the first hybrid-electric engine operating at a minimum descent idle level.

4. The hybrid-electric aircraft system according to claim 3, wherein the gas turbine engine of the second hybrid-electric engine is shut off simultaneous with diversion of the electrical power generated by the SPU to the electric motor of the second hybrid-electric engine.

5. The hybrid-electric aircraft system according to claim 1, wherein the SPU comprises a turbine operably disposed within an aircraft fuselage.

6. The hybrid-electric aircraft system according to claim 1, wherein the SPU comprises an SPU controller configured to independently operate the SPU.

7. The hybrid-electric aircraft system according to claim 1, wherein the electrical power generated by the SPU is blended with electrical power from one or more other sources for diversion to the electric motor of the second hybrid-electric engine.

8. A hybrid-electric aircraft system, comprising:
   first and second hybrid-electric engines, each of which comprises a gas turbine engine and an electric motor to drive operations of the first and second hybrid-electric engines;

a supplemental power unit (SPU) configured as a thermal engine paired with a generator and to generate electrical power; and a control system operably coupled to each of the first and second hybrid-electric engines and to the SPU, wherein the control system is configured to run the first hybrid-electric engine with the gas turbine engine of the second hybrid-electric engine shut off and to divert electrical power generated by the SPU to the electric motor of the second hybrid-electric engine, and wherein each of the first and second hybrid-electric engines comprises a full authority digital engine control (FADEC) and the SPU comprises an SPU controller which is configured to operate the SPU independently from the control system and which is directly communicative with the FADEC of each of the first and second hybrid-electric engines.

9. The hybrid-electric aircraft system according to claim 8, wherein the control system diverts electrical power generated by the SPU to the electric motor of the second hybrid-electric engine during descent.

10. The hybrid-electric aircraft system according to claim 8, wherein running of the first hybrid-electric engine comprises running the first hybrid-electric engine at a minimum descent idle level.

11. The hybrid-electric aircraft system according to claim 10, wherein the gas turbine engine of the second hybrid-electric engine is shut off simultaneous with electrical power generated by the SPU diverted to the electric motor of the second hybrid-electric engine.

12. The hybrid-electric aircraft system according to claim 8, wherein the SPU comprises a turbine operably disposed within an aircraft fuselage.

13. The hybrid-electric aircraft system according to claim 8, wherein the SPU comprises an SPU controller configured to operate the SPU independently from the control system.

14. The hybrid-electric aircraft system according to claim 8, wherein the control system is further configured to blend electrical power generated by the SPU with electrical power from one or more other sources for diversion to the electric motor of the second hybrid-electric engine.

15. A method of operating a hybrid-electric aircraft system, the hybrid aircraft system comprising first and second hybrid-electric engines, each of which comprises a gas turbine engine, an electric motor and a full authority digital engine control (FADEC), a control system and a supplemental power unit (SPU) configured to generate electrical power and comprising an SPU controller configured to independently operate the SPU independently of the control system and which is directly communicative with the FADEC of each of the first and second hybrid-electric engines, and the method comprising:

initiating a fuel conservation mode;

running the first hybrid-electric engine with the gas turbine engine of the second hybrid-electric engine shut off; and diverting electrical power generated by the SPU to the electric motor of the second hybrid-electric engine.

16. The method according to claim 15, wherein the gas turbine engine of the second hybrid-electric engine shut off is simultaneous with the diverting of the electrical power generated by the SPU to the electric motor of the second hybrid-electric engine.

17. The method according to claim 15, wherein the gas turbine engine of the second hybrid-electric engine shut off and the diverting of the electrical power generated by the SPU to the electric motor of the second hybrid-electric engine are executed during descent.

* * * * *